United States Patent
Shin

(10) Patent No.: US 9,488,875 B2
(45) Date of Patent: *Nov. 8, 2016

(54) METHOD OF MANUFACTURING A LIQUID CRYSTAL DISPLAY DEVICE

(75) Inventor: Dong Su Shin, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1685 days.

This patent is subject to a terminal disclaimer.

(21) Appl. No.: 11/637,684

(22) Filed: Dec. 13, 2006

(65) Prior Publication Data

US 2007/0263158 A1   Nov. 15, 2007

(30) Foreign Application Priority Data

May 15, 2006  (KR) .................. 10-2006-0043309

(51) Int. Cl.
*G02F 1/1341* (2006.01)

(52) U.S. Cl.
CPC ... *G02F 1/1341* (2013.01); *G02F 2001/13415* (2013.01)

(58) Field of Classification Search
CPC .................. G02F 1/1341; G02F 2001/13415
USPC ............................... 349/153, 154, 189, 190
See application file for complete search history.

(56) References Cited

U.S. PATENT DOCUMENTS

| | | | |
|---|---|---|---|
| 4,820,025 A | 4/1989 | Nakanowatari | |
| 5,361,152 A | 11/1994 | Harada et al. | |
| 5,812,232 A * | 9/1998 | Shiroto et al. | 349/157 |
| 5,835,181 A * | 11/1998 | Nakamura et al. | 349/189 |
| 5,978,065 A | 11/1999 | Kawasumi et al. | |
| 7,518,693 B2 * | 4/2009 | Eun et al. | 349/153 |
| 7,554,647 B2 * | 6/2009 | Shin | 349/189 |
| 8,325,320 B2 * | 12/2012 | Lee et al. | 349/192 |
| 8,405,814 B2 * | 3/2013 | Eun et al. | 349/189 |
| 2001/0015786 A1 * | 8/2001 | Katsura | 349/153 |
| 2002/0027629 A1 * | 3/2002 | Choo et al. | 349/122 |
| 2004/0141141 A1 * | 7/2004 | Ota et al. | 349/153 |
| 2005/0264710 A1 * | 12/2005 | Kim et al. | 349/42 |
| 2005/0275792 A1 * | 12/2005 | Chen et al. | 349/192 |
| 2006/0164590 A1 * | 7/2006 | Liu et al. | 349/190 |

FOREIGN PATENT DOCUMENTS

| | | |
|---|---|---|
| CN | 1188246 | 7/1998 |
| JP | 56-155920 | 12/1981 |
| JP | 2000-019536 | 1/2000 |
| JP | 2002-006325 | 1/2002 |
| JP | 2004-272087 | 9/2004 |
| KR | 10-2000-0038521 | 7/2000 |
| TW | 594299 | 6/2004 |
| TW | 200510881 | 3/2005 |
| TW | I240835 | 10/2005 |

* cited by examiner

*Primary Examiner* — Jessica M Merlin
(74) *Attorney, Agent, or Firm* — Dentons US LLP

(57) ABSTRACT

An LCD device and a method for manufacturing the same is disclosed, the method including preparing a liquid crystal cell including: a first substrate, a second substrate, a liquid crystal layer formed between the first and second substrates, and a sealant surrounding the liquid crystal layer and having a predetermined portion corresponding a cutting line; forming an inlet for the inflow and outflow of liquid crystal in the sealant; regulating the amount of liquid crystal through the inlet; and sealing the inlet.

14 Claims, 13 Drawing Sheets

METHOD OF MANUFACTURING A LIQUID CRYSTAL DISPLAY DEVICE

This application claims the benefit of Korean Patent Application No. P2006-43309, filed on May 15, 2006, which is hereby incorporated by reference for all purposes as if fully set forth herein.

BACKGROUND OF THE INVENTION

1. Field of the Invention

The present invention relates to a liquid crystal display (LCD) device, and more particularly, to a method for regulating the amount of liquid crystal in an LCD device manufactured by a liquid crystal dispensing method.

2. Discussion of the Related Art

Among ultra-thin flat panel displays having a thickness of several centimeters (cm), LCD devices have been generally used in notebook computers, monitors, spacecraft, airplanes, etc., because LCD devices have the advantageous characteristics of low power consumption and portability.

Hereinafter, a related art LCD device will be explained in detail.

FIG. 1 is a cross section view illustrating a related art LCD device. As shown in FIG. 1, the related art LCD device includes lower and upper substrates 10 and 20 facing each other with a predetermined interval therebetween, and a liquid crystal layer 40 formed between the lower and upper substrates 10 and 20 and sealed by a sealant 30.

Although not shown, the lower substrate 10 includes gate and data lines formed perpendicularly to define a pixel region, a thin film transistor as a switching element formed adjacent to a crossing of the gate and data lines, and a pixel electrode connected to the thin film transistor and formed in the pixel region.

Although not shown, the upper substrate 20 includes a light-shielding layer to prevent light leakage in areas except the pixel region, a color filter layer of red (R), green (G), and blue (B) to represent colors in the area corresponding to the pixel region, and a common electrode formed on the color filter layer.

The LCD device is manufactured by preparing the lower and upper substrates and forming a liquid crystal layer between the prepared lower and upper substrates. At this time, the liquid crystal layer may be formed using a liquid crystal injection method or a liquid crystal dispensing method.

For the liquid crystal injection method, a sealant having an inlet is formed on one of the lower and upper substrates, and the lower and upper substrates are bonded to each other. Then, liquid crystal is injected to a space between the lower and upper substrates through the inlet.

For the liquid crystal dispensing method, a sealant having no inlet is formed on any one of the lower and upper substrates, and liquid crystal is dispensed on any one of the lower and upper substrates. Then, the lower and upper substrates are bonded to each other.

As the size of substrate is increased, the liquid crystal injection method has the problem of low yield because the time for injecting the liquid crystal is too long. Accordingly, large panels generally use the liquid crystal dispensing method.

For the liquid crystal dispensing method, it is important to determine the appropriate amount of liquid crystal required. That is, for the liquid crystal injection method, there is no requirement to previously determine the amount of liquid crystal because the liquid crystal is injected into the space between the two substrates after bonding the two substrates to each other. However, the liquid crystal dispensing method requires a process for previously determining the amount of liquid crystal required because the two substrates are bonded to each other after dispensing the liquid crystal onto any one of the two substrates.

Currently, the amount of liquid crystal in the liquid crystal dispensing method is determined based upon the size and height of liquid crystal cell. However, it is difficult to determine the precise amount of liquid crystal need due to the various environmental conditions.

If an insufficient amount of liquid crystal is provided, unfilled regions may occur in the LCD panel, thereby degrading the picture quality. Meanwhile, if an excessive amount of liquid crystal is provided, overfilled regions may occur in the LCD panel, whereby the picture quality is degraded.

To minimize the unfilled or overfilled regions in the LCD panel, various methods for providing the exact amount of liquid crystal have been researched and studied. However, if unfilled or overfilled regions occur in the LCD panels, these LCD panels are discarded, thereby decreasing yield and increasing cost.

[MOVE???] FIGS. 2A and 2B are views for explaining the leakage of liquid crystal from a liquid crystal cell after forming an inlet for liquid crystal in a sealant, regulating the amount of liquid crystal, and sealing the inlet of liquid crystal, in sequence.

As shown in FIG. 2A, a liquid crystal cell is formed, wherein the liquid crystal cell includes a first substrate 100, a second substrate 200, a liquid crystal layer (not shown) formed between the first and second substrates 100 and 200, and a sealant 300 that surrounds the liquid crystal layer. If unfilled or overfilled regions occur, as shown in FIG. 2B, an inlet 350 for the inflow and outflow of liquid crystal is formed in the sealant 300, so as to regulate the amount of liquid crystal by discharging or supplying the liquid crystal through the inlet 350. As shown in FIG. 2C, the inlet 350 is sealed by a finish 400. At this time, because the finish 400 has a viscosity, as shown in FIG. 2C, the finish 400 may not get into the inlet 350. In this case, it is impossible to completely seal the inlet 350, whereby the liquid crystal provided inside the liquid crystal cell leaks to the outside.

SUMMARY OF THE INVENTION

Accordingly, the present invention is directed to a liquid crystal display (LCD) device and a method for manufacturing the same that substantially obviates one or more problems due to limitations and disadvantages of the related art.

An advantage of the present invention is to provide a method for manufacturing an LCD device that can prevent unfilled or overfilled regions of an LCD panel by regulating the amount of liquid crystal.

Another advantage of the present invention is to provide an LCD device that can prevent unfilled or overfilled regions of an LCD panel by regulating the amount of liquid crystal.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method for manufacturing an LCD device includes: preparing a liquid crystal cell including: a first substrate, a second substrate, a liquid crystal layer formed between the first and second substrates, and a sealant surrounding the liquid crystal layer and having a predetermined portion corresponding a cutting line; forming an inlet for the inflow and outflow of liquid crystal in the sealant; regulating the amount of liquid crystal through the inlet; and sealing the inlet.

In another aspect of the present invention, an LCD device includes: first and second substrates; a liquid crystal layer formed between the first and second substrates; a sealant surrounding the liquid crystal layer, having an inlet for the inflow and outflow of liquid crystal and provided with a predetermined portion corresponding to a cutting line; and a finish that seals the inlet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Hereinafter, an LCD device and a method for manufacturing the same according to the present invention will be explained with reference to the accompanying drawings.

A. Method of Manufacturing an LCD Device

First Embodiment

FIGS. 3A to 3D are plan views for illustrating a method of manufacturing an LCD device according to the first embodiment of the present invention.

Figure 1:
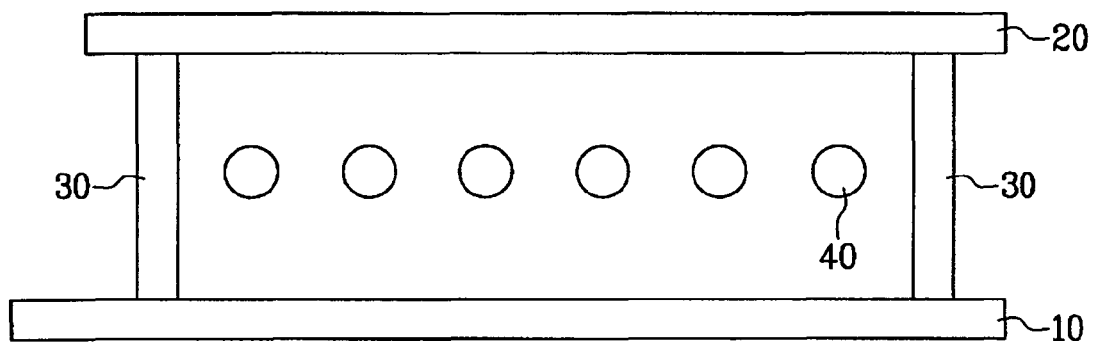
FIG. 1 is a cross section view of a related art LCD device.
Figure 2A:
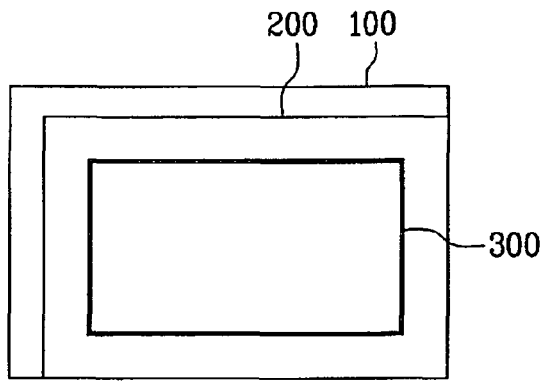
FIGS. 2A to 2C are plan views for explaining the leakage of liquid crystal from a liquid crystal cell after forming an inlet for liquid crystal in a sealant, regulating the amount of liquid crystal, and sealing the inlet of liquid crystal, in sequence.
Figure 2B:
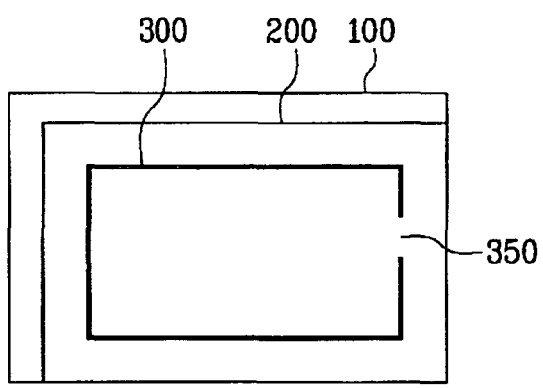
Figure 2C:
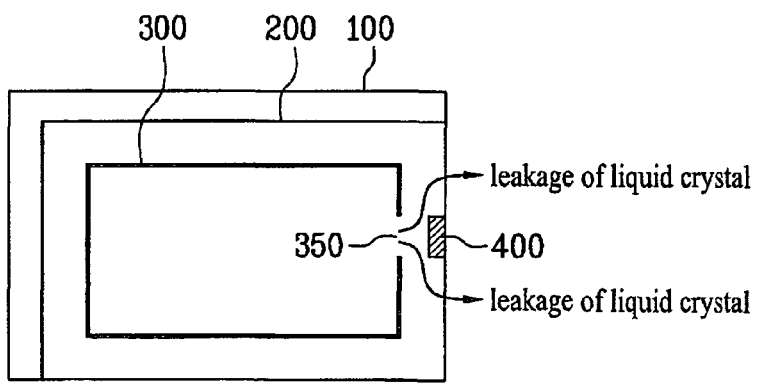
Figure 3A:
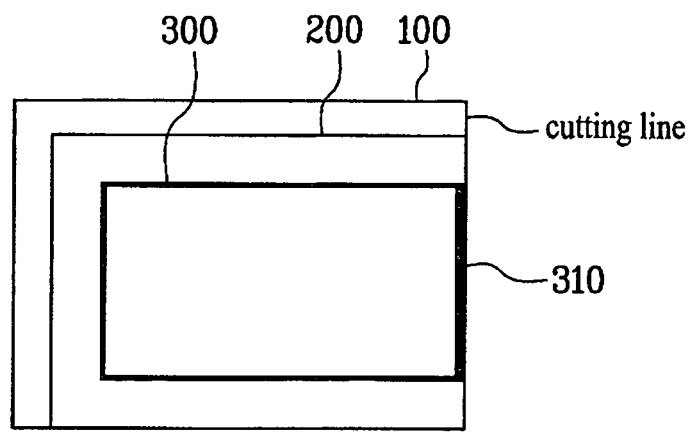
FIGS. 3A to 3D are plan views for illustrating a method of manufacturing an LCD device according to the first embodiment of the present invention.

First, as shown in FIG. 3A, a liquid crystal cell is prepared, wherein the liquid crystal cell is including a first substrate 100; a second substrate 200; a liquid crystal layer (not shown) which is formed between the first and second substrates 100 and 200; and a sealant 300 that surrounds the liquid crystal layer between the first and second substrates 100 and 200.

The process of preparing the liquid crystal cell includes: preparing the first substrate 100; preparing the second substrate 200; forming the sealant on one of the first and second substrates 100 and 200; and forming the liquid crystal layer between the first and second substrates 100 and 200.

Although not shown, the process of preparing the first substrate 100 includes forming gate and data lines crossing each other to define a unit pixel region on a transparent substrate; forming a thin film transistor adjacent to a crossing of the gate and data lines, wherein the thin film transistor functions as a switching element; and forming a pixel electrode in the pixel electrode, wherein the pixel electrode is electrically connected with the thin film transistor.

Although not shown, the process of preparing the second substrate 200 includes: forming a light-shielding layer on a transparent substrate so as to prevent light leakage; forming a color filter layer between each light-shielding layer; and forming a common electrode on the color filter layer. In case of an In-Plane Switching (IPS) mode LCD device, the common electrode is formed on the first substrate in parallel to the pixel electrode.

In order to form the sealant 300, it is possible to apply a printing or dispensing method that uses a thermal-curing or UV-curing resin, preferably, a UV-curing resin to the first or second substrate 100 or 200. At this time, one side 310 of the sealant 300 is formed corresponding to a cutting line. By forming the one side 310 corresponding to the cutting line, it is possible to prevent liquid crystal from leaking when sealing an inlet after regulating the amount of liquid crystal therethrough that will be fully explained with the following description.

The process of forming the liquid crystal layer between the first and second substrates 100 and 200 is performed using a liquid crystal dispensing method. That is, a predetermined amount of liquid crystal is dispensed on one of the first and second substrates 100 and 200, and then the two substrates 100 and 200 are bonded to each other.

The above processes and elements may vary within the scope known to those skilled in the art.

Although not shown, an inspection is performed to check the amount of liquid crystal, whereby it is determined whether the amount of liquid crystal provided in the liquid crystal cell is excessive or insufficient.

The inspection of the amount of liquid crystal in the liquid crystal cell may be performed by macrography, or other methods generally known to those skilled in the art. If the inspection result shows the amount of liquid crystal is inexact (that is, the liquid crystal is excessively or insufficiently provided), the process for overcoming the problem is performed as follows.

Figure 3B:
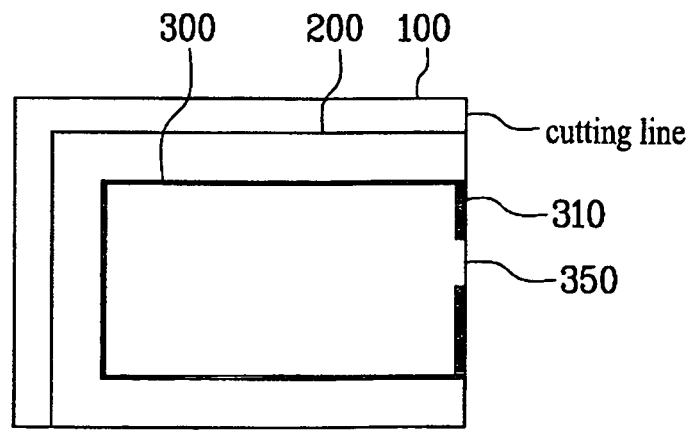

If the liquid crystal is excessively or insufficiently provided to the liquid crystal cell, as shown in FIG. 3B, the inlet 350 for the inflow and outflow of liquid crystal is provided in the sealant 300. The inlet 350 is formed at the one side 310 of the sealant corresponding to the cutting line. The inlet 350 is formed by removing the predetermined portion of the sealant 300 using a laser. In this case, the inlet 350 may be formed in shape of an opening by removing the entire width of the predetermined portion of the sealant 300, or may be formed in shape of a thin film by partially removing the width of the predetermined portion of the sealant 300.

Figure 4A:
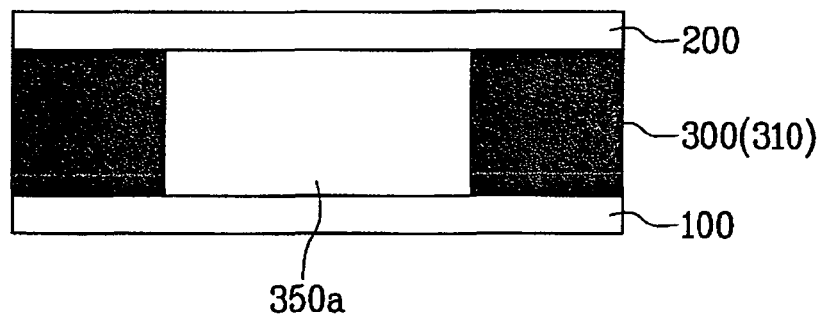
FIGS. 4A to 4C illustrate the various shapes of inlets according to the preferred embodiment of the present invention, wherein FIGS. 4A and 4B correspond to cross sectional views, and FIG. 4C corresponds to a plan view.
Figure 4B:
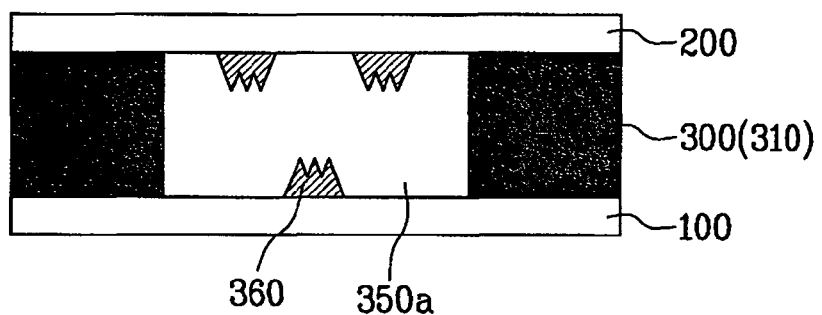
Figure 4C:
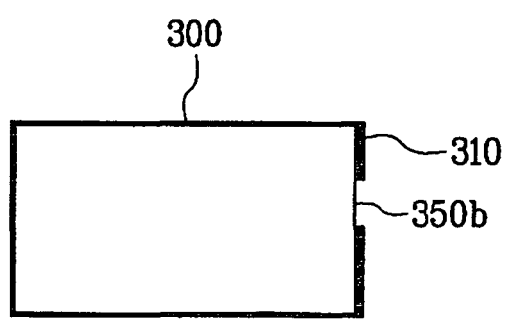

FIGS. 4A to 4C illustrate the various shapes of the inlet 350 according to an embodiment of the present invention, wherein FIGS. 4A and 4B correspond to the cross sectional views, and FIG. 4C corresponds to a plan view. That is, the inlet 350 may be formed of the opening 350*a* shown in FIGS. 4A and 4B, or may be formed of the thin film 350*b* shown in FIG. 4C.

If forming the inlet 350 in shape of the opening 350*a*, the predetermined portion of the sealant 300 may be removed completely as shown in FIG. 4A, or the remaining sealant 360 that is apart from the first or second substrate 100 or 200 may be formed as shown in FIG. 4B.

If forming the inlet 350 of the thin film 350*b*, the width of the thin film 350*b* is formed within a range between 0.25 mm and 0.6 mm, whereby the thin film is popped open by pressing out the liquid crystal provided in the liquid crystal cell in a pressurizing process.

If the inlet 350 is formed in shape of the opening 350*a* as shown in FIGS. 4A and 4B, foam may flow into the liquid crystal cell through the opening 350*a*. However, if the inlet 350 is formed in shape of the thin film 350*b* as shown in FIG. 4C, it is possible to prevent foam from flowing into the liquid crystal cell. Accordingly, it is preferable to form the inlet 350 using the thin film 350*b*.

Figure 3C:
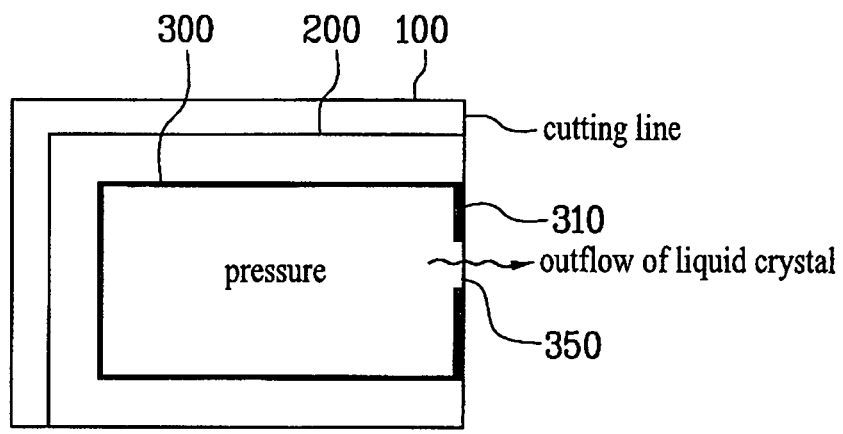

After that, as shown in FIG. 3C, a pressure is applied to the liquid crystal cell, whereby the excess liquid crystal in the liquid crystal cell is discharged through the inlet 350.

The amount of liquid crystal discharged changes based on the pressure applied to the liquid crystal cell and the time that the pressure is applied. Thus, the appropriate pressure and time is determined based on the amount of excess liquid crystal. Especially, if the inlet 350 includes a thin film 350*b*, the thin film is fissured by applying the pressure to the liquid crystal cell, and the liquid crystal is discharged. In this respect, the pressure applied in the inlet of the thin film 350*b* is larger than the pressure applied in the inlet of the opening 350*a*.

Meanwhile, FIG. 3C illustrates the case where there is excess liquid crystal. If there is insufficient liquid crystal, a predetermined amount of liquid crystal is additionally supplied to the inside of the liquid crystal cell through the inlet 350. In this case, the inlet 350 has a shape of the opening 350*a*.

Figure 3D:
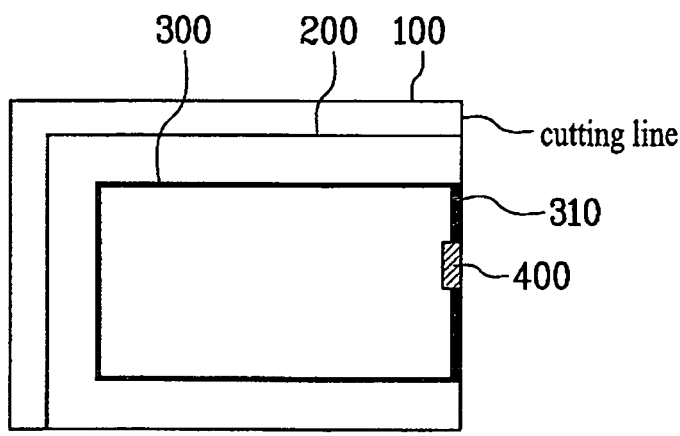

Then, as shown in FIG. 3D, the inlet 350 is sealed.

To seal the inlet 350, a finish 400 is provided in the inlet 350, and the finish 400 is hardened. If the finish 400 is formed of a thermal-curing resin, a thermal treatment is applied to the finish 400. When the finish 400 is a UV-curing resin, UV rays are applied thereto.

In the first embodiment of the present invention, the inlet 350 is formed in the side 310 of the sealant corresponding to the cutting line. In this case, by sealing the inlet 350 with the finish 400 after regulating the amount of liquid crystal through the inlet 350, it is possible to completely seal the inlet 350 with the finish 400, thereby preventing the liquid crystal provided inside the liquid crystal cell from leaking.

FIGS. 5 to 10 are plan views illustrating the method for manufacturing the LCD device according to the second to seventh embodiments of the present invention. Except the sealant, the inlet, and the formation of the finish, the second to seventh embodiments of the present invention are similar in structure to the first embodiment of the present invention, whereby the same reference numbers will be used throughout the drawings to refer to the same or like parts.

Second Embodiment

Figure 5A:
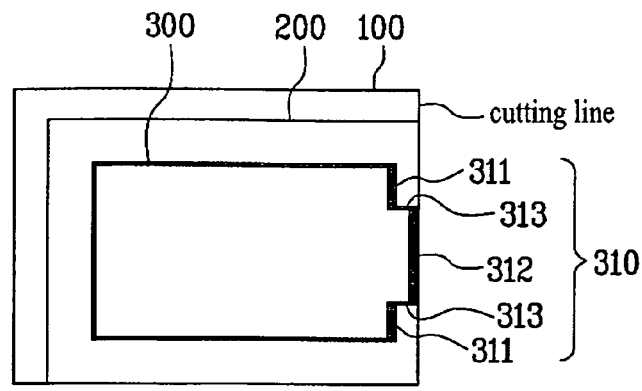
FIGS. 5A to 5C are plan views for illustrating a method of manufacturing an LCD device according to the second embodiment of the present invention.
Figure 5B:
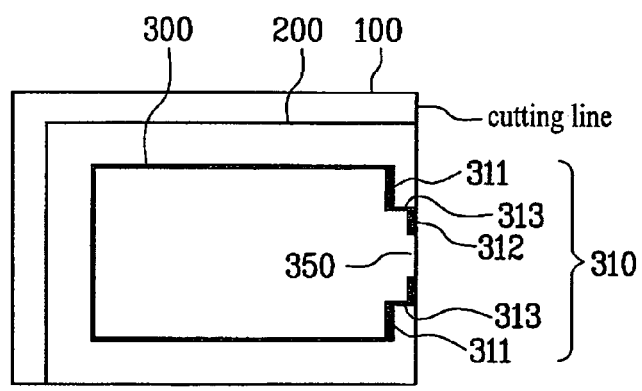
Figure 5C:
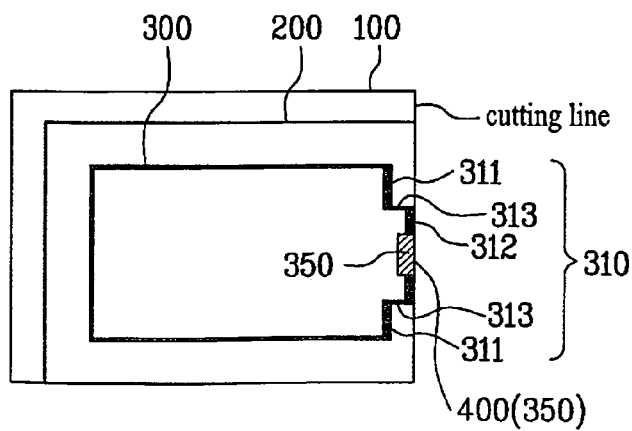

FIGS. 5A to 5C are plan views illustrating a method for manufacturing an LCD device according to the second embodiment of the present invention.

First, as shown in FIG. 5A, a liquid crystal cell is prepared, wherein the liquid crystal cell includes: a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including a first part 311 that does not correspond to a cutting line; a second part 312 that corresponds to the cutting line; and a third part 313 that connects the first and second parts 311 and 312 to each other. At this time, one end of the third part 313 is connected to one end of the first part 311, and the other end of the third part 313 is connected to one end of the second part 312.

Although not shown, an inspection is performed to determine the amount of liquid crystal, whereby it is determined whether the amount of liquid crystal in the liquid crystal cell is excessive or insufficient.

Then, as shown in FIG. 5B, an inlet 350 for the inflow and outflow of liquid crystal is created in the sealant 300. The inlet 350 is formed in one side 310 of the sealant 300, and more particularly, within the second part 312 that corresponds with the cutting line. The predetermined portion of the sealant 300 is removed by a laser, whereby the inlet 350 may be formed in a shape of an opening or a thin film.

Although not shown, pressure is applied to the liquid crystal cell, whereby the excess liquid crystal in the liquid crystal cell is discharged through the inlet 350. If the amount of liquid crystal in the liquid crystal cell is insufficient, additional liquid crystal is added to the liquid crystal cell through the inlet 350.

Then, as shown in FIG. 5C, the inlet 350 is sealed with a finish 400.

In the second embodiment of the present invention, the inlet 350 is formed in the second part 312 in the one side 310 of the sealant that corresponds to the cutting line. When sealing the inlet 350 with the finish 400, after regulating the amount of liquid crystal through the inlet 350, it is possible to completely seal the inlet 350 with the finish 400, thereby preventing the liquid crystal inside the liquid crystal cell from leaking.

Third Embodiment

Figure 6A:
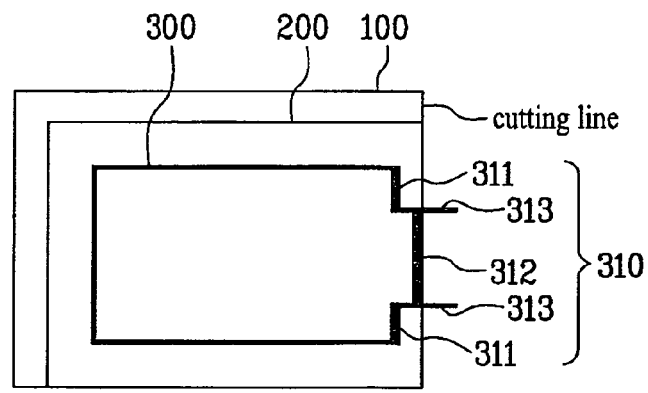
FIGS. 6A to 6C are plan views for illustrating a method of manufacturing an LCD device according to the third embodiment of the present invention.
Figure 6B:
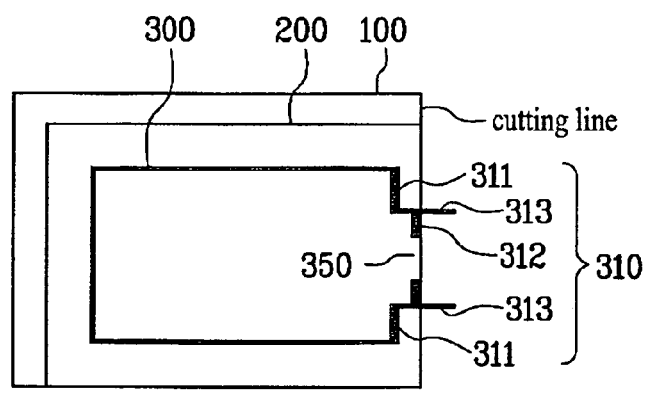
Figure 6C:
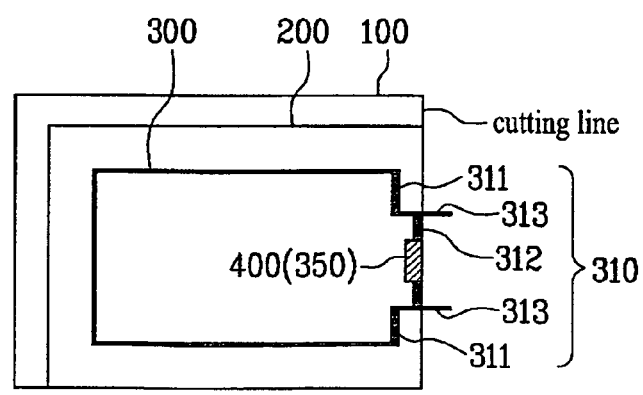

FIGS. 6A to 6C are plan views illustrating a method for manufacturing an LCD device according to the third embodiment of the present invention.

First, as shown in FIG. 6A, a liquid crystal cell is prepared, wherein the liquid crystal cell includes: a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including a first part 311 that does not correspond to a cutting line; a second part 312 that corresponds to the cutting line; and a third part 313 that connects the first and second parts 311 and 312 to each other. At this time, one end of the third part 313 is connected to one end of the first part 311, and the other end of the third part 313 extends past one end of the second part 312. A predetermined portion of the third part 313, that extends beyond the cutting line, is removed when cutting unit panels and is shown in the drawings of FIGS. 6A to 6C even though it does not exist virtually.

Although not shown, an inspection is performed to determine the amount of liquid crystal, whereby it is determined whether the amount of liquid crystal in the liquid crystal cell is excessive or insufficient.

Then, as shown in FIG. 6B, an inlet 350 for the inflow and outflow of liquid crystal is created in the sealant 300. The inlet 350 is in one side 310 of the sealant 300, and more particularly, within the second part 312 that corresponds to the cutting line. The predetermined portion of the sealant 300 is removed by a laser, whereby the inlet 350 may be formed in a shape of an opening or a thin film.

Although not shown, pressure is applied to the liquid crystal cell, whereby the excess liquid crystal in the liquid crystal cell is discharged through the inlet 350. If the amount of liquid crystal is insufficient, additional liquid crystal is added to the liquid crystal cell through the inlet 350.

Then, as shown in FIG. 6C, the inlet 350 is sealed with a finish 400.

In the third embodiment of the present invention, the inlet 350 is formed in the second part 312 in the one side 310 of the sealant that corresponds to the cutting line. When sealing the inlet 350 with the finish 400, after regulating the amount of liquid crystal through the inlet 350, it is possible to completely seal the inlet 350 with the finish 400, thereby preventing the liquid crystal provided inside the liquid crystal cell from leaking.

Fourth Embodiment

Figure 7A:
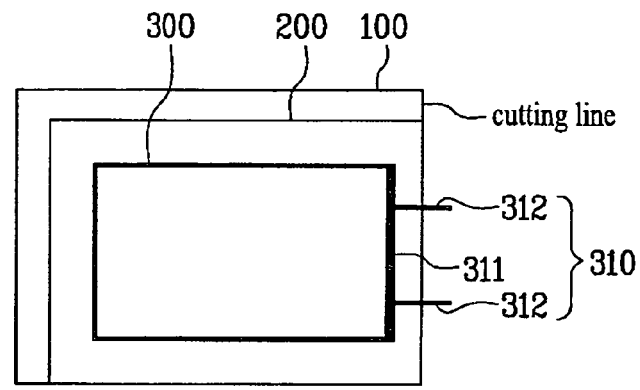
FIGS. 7A to 7C are plan views for illustrating a method of manufacturing an LCD device according to the fourth embodiment of the present invention.
Figure 7B:
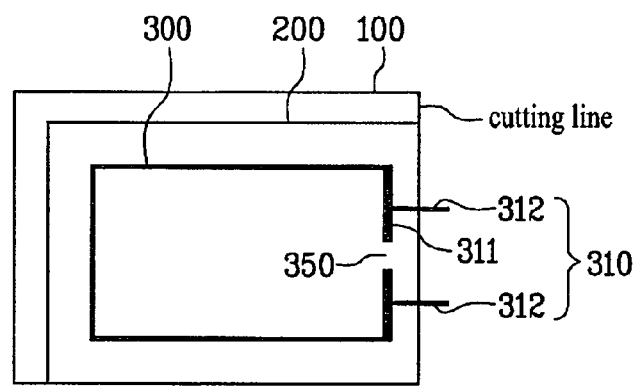
Figure 7C:
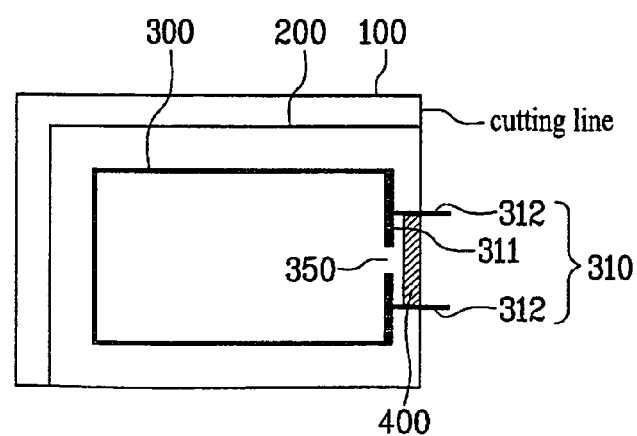

FIGS. 7A to 7C are plan views illustrating a method for manufacturing an LCD device according to the fourth embodiment of the present invention.

First, as shown in FIG. 7A, a liquid crystal cell is prepared, wherein the liquid crystal cell includes: a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including a first part 311 that does not correspond to a cutting line, and two second parts 312 that extend from the first part 311 over the cutting line.

A predetermined portion of the second part 312, that extends beyond the cutting line, is removed when cutting unit panels and is shown in the drawings of FIGS. 7A to 7C even though it does not virtually exist in the unit panel.

Although not shown, an inspection is performed to determine the amount of liquid crystal, whereby it is determined whether the amount of liquid crystal in the liquid crystal cell is excessive or insufficient.

Then, as shown in FIG. 7B, an inlet 350 for the inflow and outflow of liquid crystal is created in the sealant 300. The inlet 350 is formed in one side 310 of the sealant 300, and more particularly, in the predetermined portion of the first part 311 between the two second parts 312. The predetermined portion of the sealant 300 is removed by laser, whereby the inlet 350 may be formed in a shape of an opening or a thin film.

Although not shown, a pressure is applied to the liquid crystal cell, whereby the excess liquid crystal in the liquid crystal cell is discharged through the inlet 350. If the amount of liquid crystal in the liquid crystal cell is insufficient, additional liquid crystal is added to the liquid crystal cell through the inlet 350.

Then, as shown in FIG. 7C, a finish 400 is provided between the two second parts 312 at one side 310 of the sealant 300, to thereby seal the inlet 350. Also, the finish 400 may get into the inlet 350 so as to seal the inlet 350 completely. In FIG. 7C, the finish 400 is provided between the two second parts 312 without being in direct contact with the inlet 350. Even though the finish 400 is not in contact with the inlet 350, it is possible to prevent the liquid crystal from leaking out of the liquid crystal cell because the second part 312 and the finish 400 form a sealed wall.

Fifth Embodiment

Figure 8A:
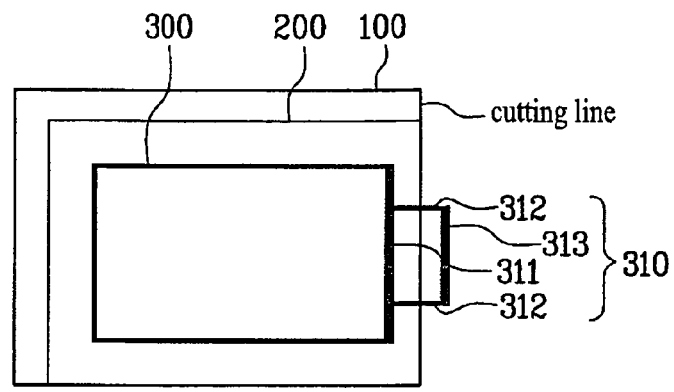
FIGS. 8A to 8C are plan views for illustrating a method of manufacturing an LCD device according to the fifth embodiment of the present invention.
Figure 8B:
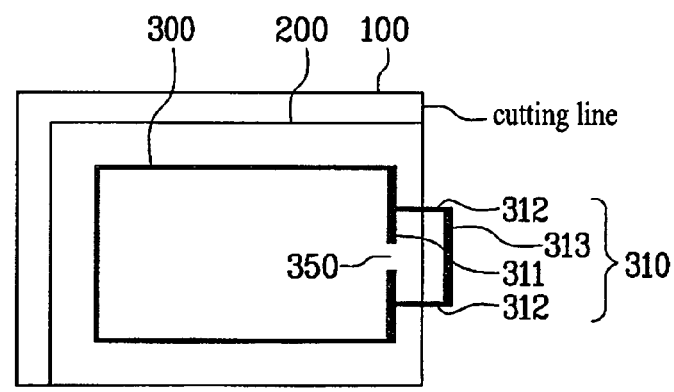
Figure 8C:
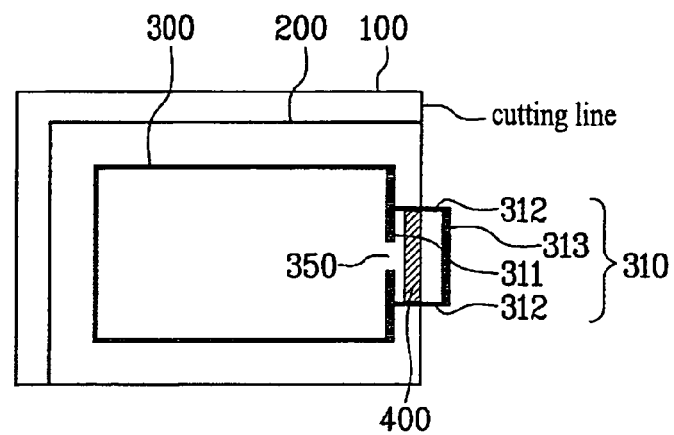

FIGS. 8A to 8C are plan views illustrating a method for manufacturing an LCD device according to the fifth embodiment of the present invention.

First, as shown in FIG. 8A, a liquid crystal cell is prepared, wherein the liquid crystal cell includes: a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including: a first part 311 that does not correspond to a cutting line; two second parts 312 that extend from the first part 311 over the cutting line; and a third part 313 that connects the two second parts 312 to each other. A predetermined portion of the second part 312, that extends beyond the cutting line and the third part 313 are removed when cutting unit panels and is shown in the drawings of FIGS. 8A to 8C even though they do not virtually exist in the unit panel.

Although not shown, an inspection is performed to determine the amount of liquid crystal, whereby it is determined whether the amount of liquid crystal in the liquid crystal cell is excessive or insufficient.

Then, as shown in FIG. 8B, an inlet 350 for the inflow and outflow of liquid crystal is created in the sealant 300. The inlet 350 is provided in one side 310 of the sealant 300, and more particularly, in the predetermined portion of the first part 311 between the two second parts 312 formed over the cutting line. The predetermined portion of the sealant 300 is removed by laser, whereby the inlet 350 may be formed in a shape of an opening or a thin film.

Although not shown, pressure is applied to the liquid crystal cell, whereby the excess liquid crystal in the liquid crystal cell is discharged through the inlet 350. If the amount of liquid crystal in the liquid crystal cell is insufficient, additional liquid crystal is added to the liquid crystal cell through the inlet 350.

Then, as shown in FIG. 8C, a finish 400 is provided between the two second parts 312 at the one side 310 of the sealant 300, to thereby seal the inlet 350. Also, the finish 400 may get into the inlet 350 so as to seal the inlet 350 completely. However, in case of FIG. 7C, the finish 400 is provided between the two second parts 312 without being in direct contact with the inlet 350. Even though the finish 400 is not in contact with the inlet 350, it is possible to prevent the liquid crystal from leaking out of the liquid crystal cell because the second part 312 and the finish 400 form a sealed wall.

Sixth Embodiment

Figure 9A:
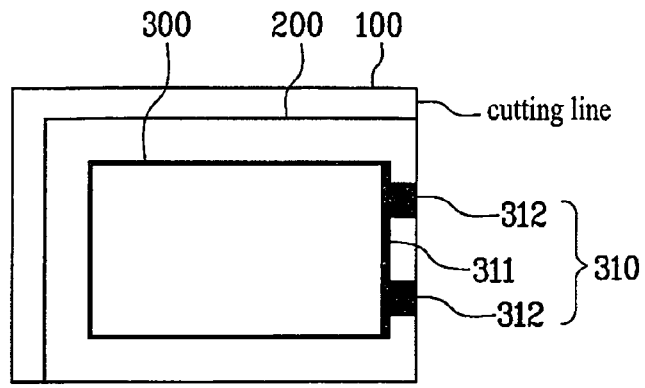
FIGS. 9A to 9C are plan views illustrating a method for manufacturing an LCD device according to the sixth embodiment of the present invention.
Figure 9B:
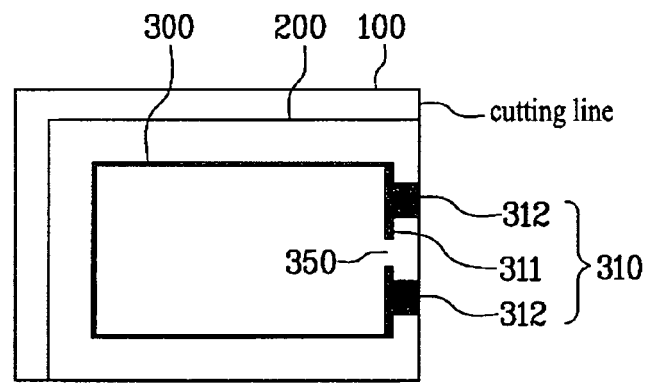
Figure 9C:
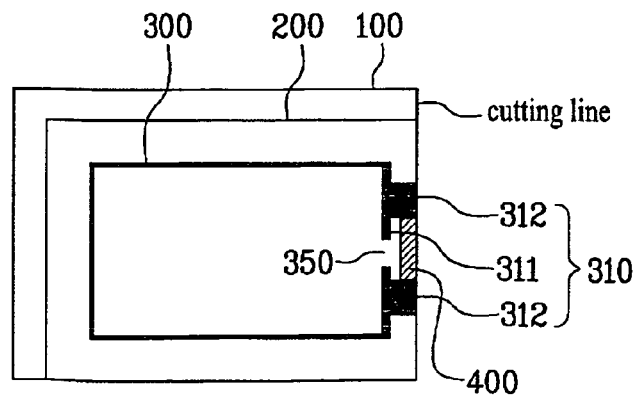

FIGS. 9A to 9C are plan views illustrating a method for manufacturing an LCD device according to the sixth embodiment of the present invention.

First, as shown in FIG. 9A, a liquid crystal cell is prepared, wherein the liquid crystal cell includes: of a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including a first part 311 that does not correspond to a cutting line, and two second parts 312 that extend from the first part 311 to the cutting line, wherein each end of the second parts 312 corresponds to the cutting line.

Although not shown, an inspection is performed to determine the amount of liquid crystal, whereby it is determined whether the amount of liquid crystal in the liquid crystal cell is excessive or insufficient.

Then, as shown in FIG. 9B, an inlet 350 for the inflow and outflow of liquid crystal is created in the sealant 300. The inlet 350 is provided in one side 310 of the sealant 300, and more particularly, in the predetermined portion of the first part 311 between the two second parts 312. The predetermined portion of the sealant 300 is removed by laser, whereby the inlet 350 may be formed in a shape of an opening or a thin film.

Although not shown, pressure is applied to the liquid crystal cell, whereby the excess liquid crystal in the liquid crystal cell is discharged through the inlet 350. If the amount of liquid crystal in the liquid crystal cell is insufficient, additional liquid crystal is added to the liquid crystal cell through the inlet 350.

Then, as shown in FIG. 9C, a finish 400 is provided between the two second parts 312 at the one side 310 of the sealant 300, to thereby seal the inlet 350. Also, the finish 400 may get into the inlet 350 so as to seal the inlet 350 completely. However, in case of FIG. 9C, the finish 400 is provided between the two second parts 312 without being in direct contact with the inlet 350. Even though the finish 400 is not in contact with the inlet 350, it is possible to prevent the liquid crystal from flowing out of the liquid crystal cell because the second part 312 and the finish 400 form a wall.

Seventh Embodiment

Figure 10A:
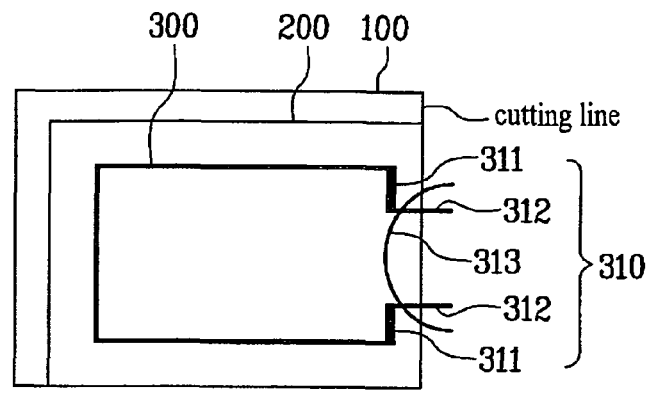
FIGS. 10A to 10C are plan views illustrating a method for manufacturing an LCD device according to the seventh embodiment of the present invention.
Figure 10B:
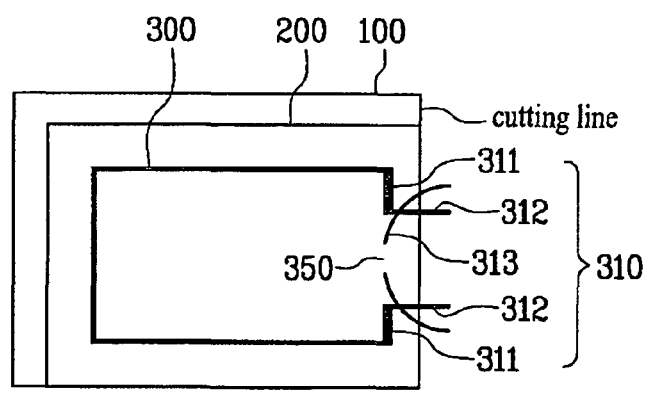
Figure 10C:
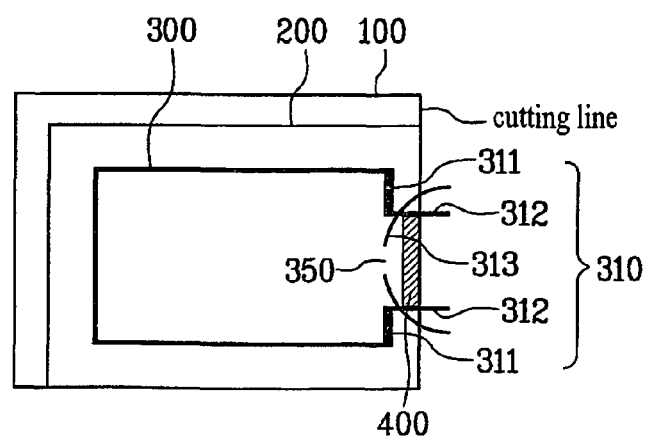

FIGS. 10A to 10C are plan views illustrating a method for manufacturing an LCD device according to the seventh embodiment of the present invention.

First, as shown in FIG. 10A, a liquid crystal cell is prepared, wherein the liquid crystal cell includes: a first substrate 100; a second substrate 200; a liquid crystal layer (not shown) that is formed between the first and second substrates 100 and 200; and a sealant 300 that surrounds the liquid crystal layer between the first and second substrates 100 and 200.

The sealant 300 has one side 310 including: a first part 311 that does not correspond to a cutting line; two second parts 312 that extend from the first part 311 over the cutting line; and a third part 313 with a curved shape that crosses the first or second part 311 or 312.

Although not shown, an inspection is performed to determine the amount of liquid crystal, whereby it is determined whether the amount of liquid crystal in the liquid crystal cell is excessive or insufficient.

Then, as shown in FIG. 10B, an inlet 350 for the inflow and outflow of liquid crystal is created in the sealant 300. The inlet 350 is provided in one side 310 of the sealant 300, and more particularly, in the predetermined portion of the third part 313 between the two second parts 312.

The predetermined portion of the sealant 300 is removed by laser, whereby the inlet 350 may be formed in a shape of an opening or a thin film.

Although not shown, pressure is applied to the liquid crystal cell, whereby the excess liquid crystal in the liquid crystal cell is discharged through the inlet 350. If the amount of liquid crystal in the liquid crystal cell is insufficient, additional liquid crystal is added to the liquid crystal cell through the inlet 350.

Then, as shown in FIG. 10C, a finish 400 is provided between the two second parts 312 at the one side 310 of the sealant 300, to thereby seal the inlet 350. Also, the finish 400 may get into the inlet 350 so as to seal the inlet 350 completely. However, in case of FIG. 10C, the finish 400 is provided between the two second parts 312 without being in direct contact with the inlet 350. Even though the finish 400 is not in direct contact with the inlet 350, it is possible to prevent the liquid crystal from flowing out of the liquid crystal cell because the second part 312 and the finish 400 form a sealed wall.

B. Liquid Crystal Display Device

Eighth Embodiment

Figure 11:
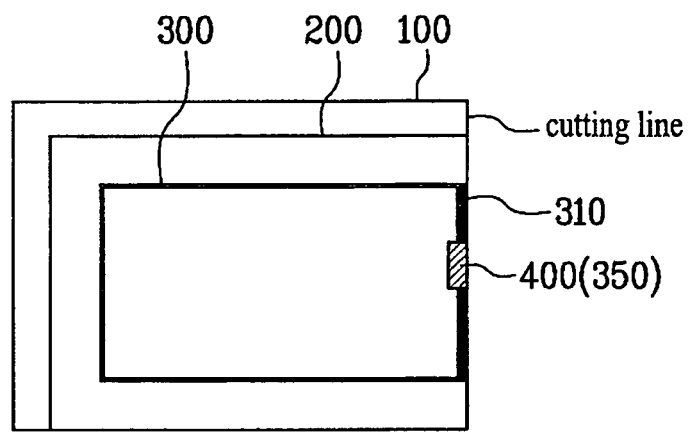
FIG. 11 is a plan view illustrating an LCD device according to the eighth embodiment of the present invention.

FIG. 11 is a plan view illustrating an LCD device according to the eight embodiment of the present invention, wherein the LCD device is manufactured using the above method according to the first embodiment of the present invention shown in FIGS. 3A to 3D. Thus, the following detailed explanation can be fully understood with reference to the first embodiment of the present invention.

As shown in FIG. 11, the LCD device according to the eighth embodiment of the present invention includes: a first substrate 100; a second substrate 200; a liquid crystal layer (not shown) formed between the first and second substrates 100 and 200; a sealant 300 that includes an inlet 350 for the inflow and outflow of liquid crystal and surrounds the liquid crystal layer between the first and second substrates 100 and 200; and a finish 400 that seals the inlet 350.

The first and second substrates 100 and 200 are identical in structure to those above, whereby the detailed explanation for the structure of the first and second substrates will be omitted.

In the LCD device according to the eighth embodiment of the present invention, one side 300 of the sealant 300 corresponds to a cutting line. Also, the inlet 350 is formed at the side 300 of the sealant that corresponds to the cutting line.

The inlet 350 may have a shape of an opening that is formed by completely removing the entire width in the predetermined portion of the sealant 300 or may have a shape of a thin film that is formed by decreasing the width in the predetermined portion of the sealant 300.

If forming the inlet 350 in a shape of the opening, the predetermined portion of the sealant 300 may be removed completely, or the remaining sealant that is apart from the first or second substrate 100 or 200 may be formed.

Ninth Embodiment

Figure 12:
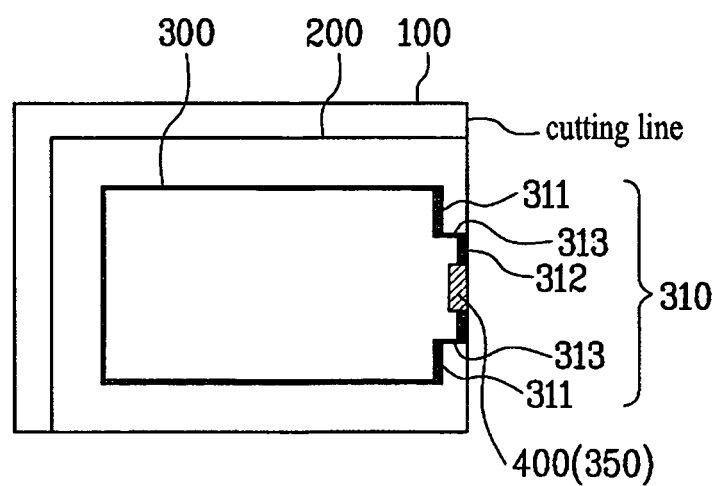
FIG. 12 is a plan view illustrating an LCD device according to the ninth embodiment of the present invention.

FIG. 12 is a plan view illustrating an LCD device according to the ninth embodiment of the present invention, wherein the LCD device is manufactured using the above methods according to the second and third embodiments of the present invention shown in FIGS. 5 and 6.

Except that one end of the third part 313 extends past one end of the second part 312 at one side 310 of the sealant, the third embodiment of FIG. 6 is identical in structure to the second embodiment of FIG. 5. In FIG. 6, the predetermined portion of the third part 313 extending past one end of the second part 312, that extends beyond the cutting line, is removed when cutting unit panels. The LCD device manufactured by the second embodiment of FIG. 5 is virtually the same as the LCD device manufactured by the third embodiment of FIG. 6, that is, the LCD device manufactured by the second and third embodiments of the present invention corresponds to FIG. 12.

As shown in FIG. 12, the LCD device according to the ninth embodiment of the present invention includes: a first substrate 100; a second substrate 200; a liquid crystal layer (not shown) formed between the first and second substrates 100 and 200; a sealant 300 that includes an inlet 350 for the inflow and outflow of liquid crystal and surrounds the liquid crystal layer between the first and second substrates 100 and 200; and a finish 400 that seals the inlet 350.

The first and second substrates 100 and 200 are identical in structure to those above, whereby the detailed explanation for the structure of the first and second substrates will be omitted.

The sealant 300 has one side 310 includes: a first part 311 that does not correspond to a cutting line; a second part 312 that corresponds with the cutting line; and a third part 313 that connects the first and second parts 311 and 312 to each other. At this time, one end of the third part 313 is connected to one end of the first part 311, and the other end of the third part 313 is connected to one end of the second part 312.

The inlet 350 is formed at the one side 310 of the sealant, and more preferably, within the second part 312 corresponding to the cutting line.

The inlet 350 may have a shape of an opening that is formed by completely removing the entire width in the predetermined portion of the sealant 300, or may have a shape of a thin film that is formed by decreasing the width in the predetermined portion of the sealant 300. If forming the inlet 350 in a shape of the opening, the predetermined portion of the sealant 300 may be removed completely, or the remaining sealant that is apart from the first or second substrate 100 or 200 may be formed.

Tenth Embodiment

Figure 13:
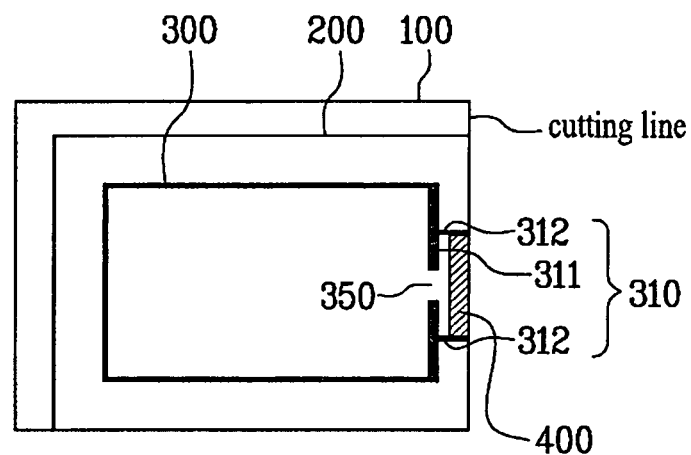
FIG. 13 is a plan view illustrating an LCD device according to the tenth embodiment of the present invention; and, FIG. 14 is a plan view illustrating an LCD device according to the eleventh embodiment of the present invention.

FIG. 13 is a plan view illustrating an LCD device according to the tenth embodiment of the present invention, wherein the LCD device is manufactured using the above methods according to the fourth, fifth and sixth embodiment of the present invention shown in FIGS. 7, 8 and 9.

The predetermined portion of the second part 312 that extends beyond the cutting line in the fourth embodiment of FIG. 7, and the predetermined portion of the second part 312 that extends beyond the cutting line in the fifth embodiment of FIG. 8 are removed on when cutting the unit panels. Accordingly, the LCD devices manufactured by the fourth, fifth and sixth embodiments of FIGS. 7, 8 and 9 have virtually the same structure, that corresponds to FIG. 13.

As shown in FIG. 13, the LCD device according to the tenth embodiment of the present invention includes: a first substrate 100; a second substrate 200; a liquid crystal layer (not shown) formed between the first and second substrates 100 and 200; a sealant 300 that includes an inlet 350 for the inflow and outflow of liquid crystal and surrounds the liquid crystal layer between the first and second substrates 100 and 200; and a finish 400 that seals the inlet 350.

The first and second substrates 100 and 200 have the same structure as those above, whereby the detailed explanation will be omitted.

The sealant 300 has one side 310 includes a first part 311 that does not correspond to the cutting line, and a plurality of second parts 312 that extend from the first part to the cutting line.

The inlet 350 is formed at the one side 310 of the sealant, and more preferably, at the predetermined portion of the first part 311 between the second parts 312 extending to the cutting line.

The inlet 350 may have a shape of an opening that is formed by completely removing the entire width in the predetermined portion of the sealant 300, or may have a shape of a thin film that is formed by decreasing the width in the predetermined portion of the sealant 300. If forming the inlet 350 in a shape of the opening, the predetermined portion of the sealant 300 may be removed completely, or the remaining sealant that is apart from the first or second substrate 100 or 200 may be formed.

The finish 400 is formed between the second parts 312.

Eleventh Embodiment

Figure 14:
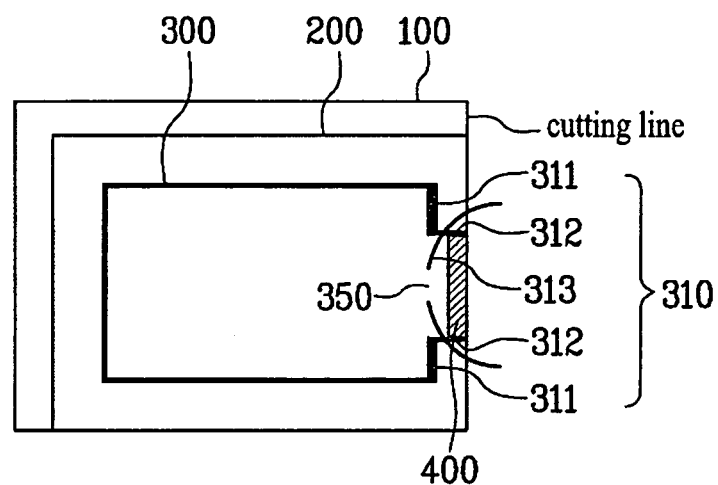

FIG. 14 is a plan view illustrating an LCD device according to the eleventh embodiment of the present invention, wherein the LCD device is manufactured using the above method according to the seventh embodiment of the present invention shown in FIG. 10.

As shown in FIG. 14, the LCD device according to the eleventh embodiment of the present invention includes: a first substrate 100; a second substrate 200; a liquid crystal layer (not shown) formed between the first and second substrate 100 and 200; a sealant 300 that includes an inlet 350 for the inflow and outflow of liquid crystal and surrounds the liquid crystal layer between the first and second substrates 100 and 200; and a finish 400 that seals the inlet 350.

The first and second substrates 100 and 200 have the same structure as those above, whereby the detailed explanation will be omitted.

The sealant 300 has one side 310 includes: a first part 311 that does not correspond to the cutting line; a plurality of second parts 312 that extend from the first part 311 to the cutting line; and a third part 313 with a curved shape that crosses the first or second parts 311 or 312.

The inlet 350 is formed at one side 310 of the sealant, and more preferably, at the predetermined portion of the third part 313 between the second parts 312 extending to the cutting line.

The inlet 350 may have a shape of an opening that is formed by completely removing the entire width in the predetermined portion of the sealant 300 or may have a shape of a thin film that is formed by decreasing the width in the predetermined portion of the sealant 300. If forming the inlet 350 in a shape of the opening, the predetermined portion of the sealant 300 may be removed completely, or the remaining sealant that is apart from the first or second substrate 100 or 200 may be formed.

The finish 400 is formed between the second parts 312.

As mentioned above, the LCD device and the method for manufacturing the same according to the present invention have the following advantages.

First, the amount of liquid crystal is regulated through the inlet formed in the sealant. Thus, even though the liquid crystal is excessively or insufficiently provided, the excessive amount of liquid crystal may be discharged through the inlet, or the insufficient amount of liquid crystal may be provided into the liquid crystal cell through the inlet.

Also, the sealant has the predetermined portion corresponding to the cutting line, whereby it is possible to prevent the liquid crystal from flowing out of the liquid crystal cell on the process of sealing the inlet after regulating the amount of liquid crystal through the inlet.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing an LCD device comprising the following sequence:
    (1) preparing a liquid crystal cell including a first substrate, a second substrate, a liquid crystal layer between the first and the second substrates, and a sealant contiguously surrounding the liquid crystal layer, wherein the liquid crystal layer is enclosed by the sealant and the sealant has a side coinciding with a cutting line;
    (2) forming an inlet for an inflow and an outflow of liquid crystal in the sealant by removing only a partial width of a predetermined portion of the side of the sealant coinciding with the cutting line using a laser;
    (3) regulating an amount of liquid crystal through the inlet; and
    (4) sealing the inlet,
    wherein an entire side of the sealant coinciding with the cutting line is straight.

2. The method of claim 1, wherein preparing the liquid crystal cell includes:
    preparing the first and the second substrates;
    forming the sealant on one of the first and the second substrates;
    dispensing a predetermined amount of liquid crystal onto any one of the first and the second substrates; and
    bonding the first and the second substrates to each other.

3. The method of claim 1, wherein removing the sealant material in the predetermined portion includes completely removing the sealant material in the predetermined portion.

4. The method of claim 1, wherein the process of forming the inlet includes providing the remaining sealant that is apart from the first or second substrate.

5. The method of claim 1, wherein the process of removing the sealant in the predetermined portion includes forming the inlet of a thin film type by decreasing the width in the predetermined portion of the sealant.

6. The method of claim 5, wherein the inlet of the thin film type is formed with a width that opens by pressing out the liquid crystal provided in the liquid crystal cell in a pressurizing process.

7. The method of claim 6, wherein the inlet of the thin film type is formed within a range between 0.25 mm and 0.6 mm.

8. The method of claim 1, wherein regulating the amount of liquid crystal includes discharging an excess amount of liquid crystal inside the liquid crystal cell.

9. The method of claim 8, wherein discharging the excess amount of liquid crystal inside the liquid crystal cell includes applying a pressure to the liquid crystal cell.

10. The method of claim 9, wherein the process of applying the pressure to the liquid crystal cell includes popping the inlet of the sealant.

11. The method of claim 1, wherein regulating the amount of liquid crystal includes supplying a predetermined amount of liquid crystal into the liquid crystal cell.

12. The method of claim 1, wherein sealing the inlet includes providing a finish to the inlet and hardening the finish.

13. The method of claim 1, further comprising:
    performing an inspection for determining whether the amount of liquid crystal inside the liquid crystal cell is insufficient or excessive.

14. The method of claim 13, wherein the inspection is performed by macrography.

* * * * *